(12) United States Patent
Kim et al.

(10) Patent No.: US 8,766,892 B2
(45) Date of Patent: Jul. 1, 2014

(54) DISPLAY DEVICE WITH DISPLAY PANEL HAVING SENSORS THEREIN

(75) Inventors: Hyungguel Kim, Seongnam-si (KR); Woongkwon Kim, Cheonan-si (KR); HeeJoon Kim, Asan-si (KR); Daecheol Kim, Hwaseong-si (KR); Ki-Hun Jeong, Cheonan-si (KR); Kyung-ho Park, Cheonan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 428 days.

(21) Appl. No.: 13/165,913

(22) Filed: Jun. 22, 2011

(65) Prior Publication Data

US 2012/0200511 A1     Aug. 9, 2012

(30) Foreign Application Priority Data

Feb. 7, 2011 (KR) .................. 10-2011-0010723

(51) Int. Cl.
*G06F 3/041* (2006.01)
(52) U.S. Cl.
USPC ......................... 345/87; 345/173; 345/204

(58) Field of Classification Search
USPC ............... 345/173–176, 87, 89, 92, 204, 207; 349/12, 59, 106–107
See application file for complete search history.

(56) References Cited

U.S. PATENT DOCUMENTS

| 7,675,580 | B2* | 3/2010 | Rho ................................. 349/12 |
| 7,737,952 | B2* | 6/2010 | Shigetaka ..................... 345/173 |
| 2009/0109202 | A1* | 4/2009 | Kitagawa ...................... 345/206 |
| 2009/0128470 | A1* | 5/2009 | Kim et al. ...................... 345/87 |
| 2009/0201261 | A1* | 8/2009 | Day ............................... 345/173 |
| 2010/0053056 | A1* | 3/2010 | Lee et al. ........................ 345/94 |
| 2010/0053103 | A1* | 3/2010 | No et al. ........................ 345/173 |
| 2010/0134427 | A1* | 6/2010 | Tsai et al. ...................... 345/173 |

* cited by examiner

*Primary Examiner* — Andrew Sasinowski
(74) *Attorney, Agent, or Firm* — F. Chau & Associates, LLC

(57) ABSTRACT

A display device includes a first substrate with pixels for displaying an image and a first wire transmitting a common voltage received from an outside source. A second substrate includes a second wire transmitting the common voltage received from the outside source and a common electrode receiving the common voltage from the first wire and the second wire. Conductive spacers are formed between the first wire and the common electrode in correspondence with a part of an area where the first wire is formed, and electrically connect the first wire to the common electrode.

21 Claims, 12 Drawing Sheets

DISPLAY DEVICE WITH DISPLAY PANEL HAVING SENSORS THEREIN

CROSS-REFERENCE TO RELATED APPLICATION

This application relies for priority upon Korean Patent Application No. 10-2011-0010723 filed on Feb. 7, 2011, the contents of which are herein incorporated by reference in their entirety.

BACKGROUND OF THE INVENTION

1. Technical Field

The present invention relates to a display device. More particularly, the present invention relates to a display device provided with a display panel having sensors therein.

2. Discussion of the Related Art

A touchscreen is an input/output device that combines the function of a display with the function of a touch panel so that a user can provide input by touching portions of the touchscreen, either with a stylus or with fingers as the touchscreen displays information. Since a touchscreen does not require the use of a separate input device (e.g., a keyboard and a mouse) connected to the display device, touchscreens have been used in various fields.

A touchscreen may be made by combining a touch panel with a liquid crystal display (LCD) device. In such a case, the touch panel is provided at an outer side of a liquid crystal display panel, which is the side of the LCD panel closest to the user. The LCD panel displays an image and the touch panel detects position information from user input. However, if the touch panel is provided separately from the liquid crystal display panel, the optical characteristics (e.g., brightness and a viewing angle) of the liquid crystal display device may deteriorate and the total thickness of the liquid crystal display device may be increased by the thickness of the touch panel.

SUMMARY OF THE INVENTION

Exemplary embodiments of the present invention provide a display device capable of increasing sensing accuracy by preventing the distortion of a common voltage.

In one aspect, a display device includes a first substrate, a second substrate, a plurality of sensors, a liquid crystal layer, and at least one conductive spacer.

The first substrate includes a first base substrate, a plurality of pixels, and a first wire.

The first base substrate includes a display area where the pixels are formed, and first to fourth peripheral areas that surround the display area. The pixels are formed on the display area and display an image. The first wire is formed in the first to fourth peripheral areas and transmit a common voltage received from an outside source.

The second substrate includes a second base substrate, a second wire, and a common electrode.

The second base substrate is opposite to the first base substrate and the second substrate includes first to fourth peripheral areas corresponding to the first to fourth peripheral areas of the first base substrate in a one-to-one correspondence. The second wire transmits the common voltage received from the outside source, and the common electrode receives the common voltage from the first wire and the second wire. The second wire is formed in at least one of the second to fourth peripheral areas.

The conductive spacers are formed between the first wire and the common electrode in correspondence with a part of an area where the first wire is faulted, and the conductive spacers electrically connect the first wire to the common electrode. The sensors sense an external signal to output sensing signals, and the liquid crystal layer is interposed between the first substrate and the second substrate.

According to the display device as described above, the common voltage is supplied to the common electrode through the second wire provided on the second substrate as well as the first wire provided on the first substrate. Furthermore, part of the second wire may be formed in a short axis direction of the display device, and accordingly, the common voltage may be uniformly provided to an entire area where the common electrode is formed.

Consequently, the common voltage may be prevented from being distorted, and a sensing error due to the distortion of the common voltage may be reduced, resulting in the increasing of sensing accuracy.

BRIEF DESCRIPTION OF THE DRAWINGS

The above and other aspects of the present invention will become readily apparent by reference to the following detailed description when considered in conjunction with the accompanying drawings wherein.

DETAILED DESCRIPTION OF THE EXEMPLARY EMBODIMENTS

Figure 1:
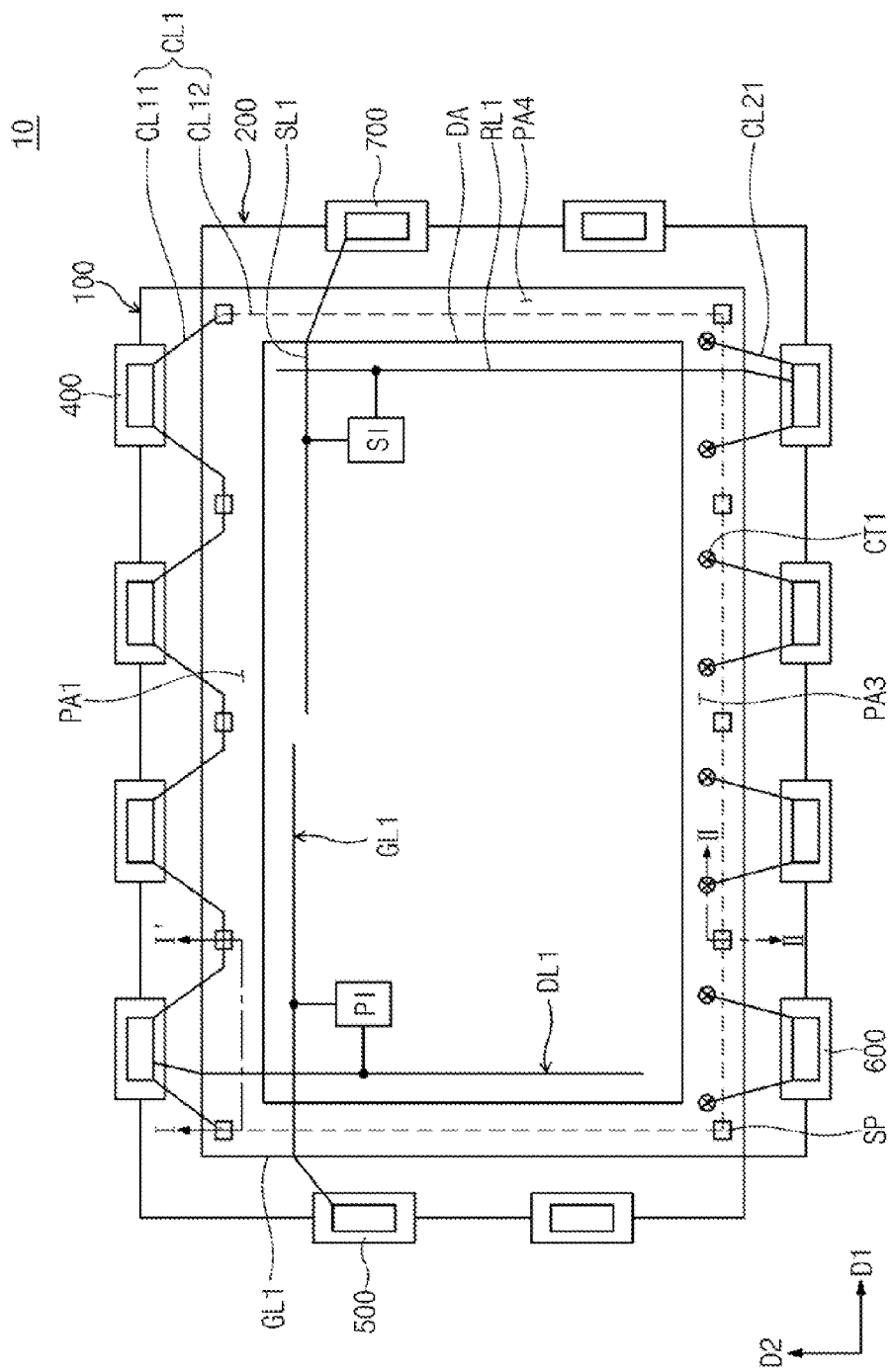
FIG. 1 is a plan view showing a display device according to an exemplary embodiment of the present invention.

The present invention can be modified in various forms and should not be limited to the following embodiments but may include various applications and modifications.

When describing each attached drawing, similar reference numerals may be designated as similar components. In addition, the size of the layers and regions of the attached drawings along with the following embodiments may be simplified or exaggerated for precise explanation or emphasis. The same reference numeral may represent the same component throughout the disclosure.

When a layer, a film, a region, or a plate is said to be formed on another layer, another film, another region, or another plate, the layer, the film, the region, or the plate may be directly formed on another layer, another film, another region, or another plate, or a third layer, a third film, a third region, or a third plate may be interposed between the layer, the film, the region, or the plate and another layer, another film, another region, or another plate. When a layer, a film, a region, or a plate is mentioned as to be formed below another layer, another film, another region, or another plate, the layer, the film, the region, or the plate may be directly formed under another layer, another film, another region, or another plate, or a third layer, a third film, a third region, or a third plate may be interposed between the layer, the film, the region, or the plate and another layer, another film, another region, or another plate.

Figure 2:
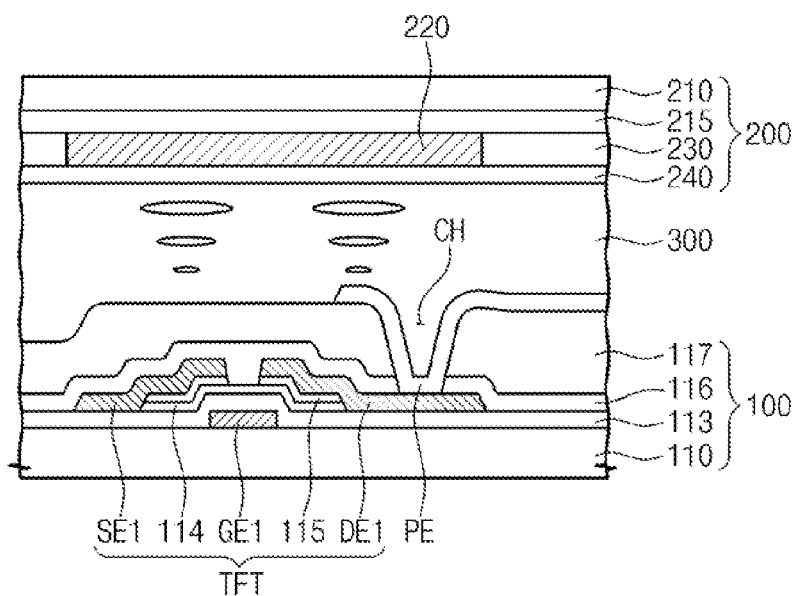
FIG. 2 is a cross sectional view of a pixel shown in FIG. 1.
Figure 3:
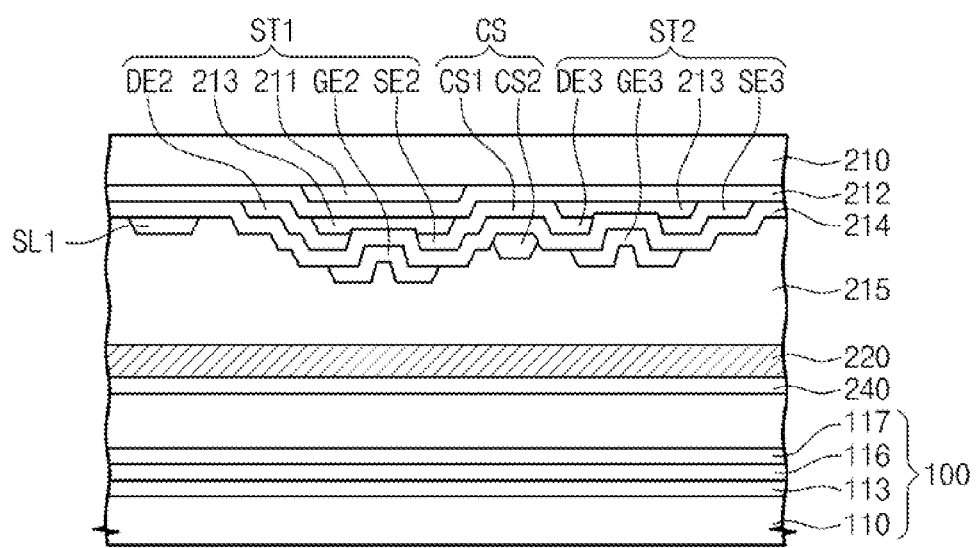
FIG. 3 is a cross sectional view of a sensor shown in FIG. 1.

FIG. 1 is a plan view showing a display device according to an exemplary embodiment of the present invention, FIG. 2 is a cross sectional view of a pixel shown in FIG. 1, and FIG. 3 is a cross sectional view of a sensor shown in FIG. 1.

Referring to FIGS. 1 to 3, the display device 10 includes a first substrate 100, a second substrate 200, a liquid crystal layer 300, data driving circuits 400, gate driving circuits 500, read-out circuits 600, scan driving circuits 700, and conductive spacers SP.

The first substrate 100 includes a first base substrate 110, a plurality of gate lines provided on the first base substrate 110, a plurality of data lines crossing the plurality of gate lines, and a plurality of pixels P1. For the purpose of convenience, FIG. 1 shows only a first gate line GL1 and a first data line DL1.

The first base substrate 110 is an insulating substrate including glass or plastic. For example, the first base substrate 110 has a rectangular shape having two sides extending in the first direction D1 and two sides extending in the second direction D2 crossing the first direction D1. The first base substrate 110 includes a display area DA where the plurality of pixels P1 are formed, and first to fourth peripheral areas PA1 to PA4 surrounding the display area DA.

The gate lines are formed on the first base substrate 110, extend in the first direction D1, and transmit gate signals provided from the gate driving circuits 500 to the pixels P1. The data lines are formed on the first base substrate 110, extend in the second direction D2, and transmit data voltages provided from the data driving circuits 400 to the pixels P1.

In FIG. 1, since the pixels PA have the same structure, the following description will be made with respect to one pixel connected to the first gate line GL1 and the first data line DL1.

Each pixel P1 includes a thin film transistor TFT and a pixel electrode PE. The thin film transistor TFT includes a first gate electrode GE1 branching from the first gate line GL1, an active layer 114 and an ohmic contact layer 115 sequentially formed above the first gate electrode GE1, a first source electrode SE1 formed on the ohmic contact layer 115 while branching from the first data line DL1, and a first drain electrode DE1 electrically connected to the pixel electrode PE.

The first substrate 100 further includes a gate insulating layer 113 formed on the first base substrate 110 to cover the first gate electrode GE1 and the gate lines, and a protective layer 116 and an organic insulating layer 117 which are sequentially formed on the gate insulating layer 113 to cover the first source electrode SE1, the first drain electrode DE1 and the data lines. The pixel electrode PE is formed on the upper surface of the organic insulating layer 117 and is electrically connected to the first drain electrode DE1 through a contact hole CH formed by partially removing the protective layer 116 and the organic insulating layer 117.

The data driving circuits 400 are provided in the first peripheral area PA1 of the first base substrate 110. The data driving circuits 400 may be arranged in the form of a tape carrier package (TCP) or a chip on film (COF). The data driving circuits 400 electrically connect the data lines to a data printed circuit board (not shown). Each data driving circuit 400 receives a data control signal from the data printed circuit board and outputs the data voltage to each data line connected thereto.

The gate driving circuits 500 are provided in the second peripheral area PA2 of the first base substrate 110. The gate driving circuits 500 may be arranged in the form of the TCP or may be integrated with the first base substrate 110. The gate driving circuits 500 electrically connect the gate lines to a gate printed circuit board (not shown). Each gate driving circuit 500 receives a gate control signal from the gate printed circuit board and outputs the gate control signal to each gate line connected thereto.

The data voltage is applied to the data lines at the point in time at which thin film transistors in one row are turned on in synchronization with the gate signal, and are applied to the pixel electrodes PE through the thin film transistors. A a DC type common voltage is applied to a common electrode 240 which will be described later. Each pixel P1 drives the liquid crystal layer 300 by an electric field generated by a potential difference between the common voltage and the data voltage, thereby controlling light transmittance, resulting in the display of an image.

When the data voltage with a positive polarity relative to the common voltage is continuously applied to the pixels, the liquid crystal layer may deteriorate. Therefore, the data driving circuit 400 may invert the polarity of the data voltage relative to the common voltage in units of image frames in response to a polarity inversion signal.

The second substrate 200 includes a second base substrate 210, a plurality of scan lines provided on the second base substrate 210, a plurality of read-out lines crossing the plurality of scan lines, a plurality of sensors S1, and the common electrode 240. FIG. 1 shows only a first scan line SL1 of the plurality of scan lines and only a first read-out line RL1 of the plurality of read-out lines.

The second base substrate 210 is an insulating substrate including glass or plastic. For example, the second base substrate 210 has a rectangular shape having two sides extending in the first direction D1 and two sides extending in the second direction D2 crossing the first direction D1. The second base substrate 210 includes first to fourth peripheral areas PA1 to PA4 corresponding to the first to fourth peripheral areas PA1 to PA4 of the first base substrate 110 in a one-to-one fashion.

The scan lines are formed on the second base substrate 210, extend in the first direction D1, and transmit scan signals provided from the scan driving circuits 700 to the sensors S1. The read-out lines are formed on the second base substrate 210, extend in the second direction D2, and receive sensing signals provided from corresponding sensors S1 to transmit the sensing signals to the read-out circuits 600.

Since the sensors S1 have the same structure, the following description will be made with respect to one sensor connected to the first scan line SL1 and the first read-out line RL1.

Referring to FIGS. 2 and 3, each sensor S1 includes a switching transistor ST1, a sensor transistor ST2, and a capacitor CS. The switching transistor ST1 includes a second source electrode SE2, a second drain electrode DE2, a semiconductor layer 213, a second gate electrode GE2.

A light blocking layer 211 may be formed at the lower portion of the switching transistor ST1. The light blocking layer 211 is formed to prevent the semiconductor layer 213 from reacting with light. The light blocking layer 211 may consist of a metal. A first insulating layer 212 is formed on the light blocking layer 211. The second source electrode SE2 and the second drain electrode DE2 are formed on the first insulating layer 212 and spaced apart from each other. Although not shown in the drawings, the second drain electrode DE2 branches from the first read-out line RL1.

The semiconductor layer 213 is formed between the second source electrode SE2 and the second drain electrode DE2. The semiconductor layer 213 may include amorphous silicon or silicon germanium.

A second insulating layer 214 covers the semiconductor layer 213, the second source electrode SE2, and the second drain electrode DE2. The second gate electrode GE2 is formed on the second insulating layer 214 corresponding to an area where the semiconductor layer 213 is formed. Although not shown in the drawings, the second gate electrode GE2 branches from the first scan line SL1.

The sensor transistor ST2 includes a third source electrode SE3, a third drain electrode DE3, the semiconductor layer 213, and a third gate electrode GE3. The sensor transistor ST2 may have the same structure as that of the switching transistor ST1. The second drain electrode DE2 is connected to the third drain electrode DE3.

The capacitor CS includes a first electrode CS1 and a second electrode CS2 facing the first electrode CS1. The first electrode CS1 is connected to the second source electrode SE2 and the third drain electrode DE3. For example, the third drain electrode DE3, the second source electrode SE2, and the first electrode CS1 may be integrally formed with one another. The second electrode CS2 is formed on the second insulating layer 214 while facing the first electrode CS1.

The sensor transistor ST2 senses light incident from an outside source and outputs a sensing signal corresponding to the intensity of the sensed light. A bias voltage is applied to the third gate electrode GE3 and a ground voltage is applied to the third source electrode SE3. Although not shown in the drawings, a light source is positioned at the rear surface of the display device 10 to emit light such as infrared light. Most of the light passes through the display device, but when an object exists on the upper surface of the second substrate 200, light reflected by the object may be sensed through the sensor transistor ST2 provided on the second substrate 200. The reflected light is incident into the semiconductor layer 213 of the sensor transistor ST2, and a photo current which is output from the sensor transistor ST2 varies depending on the intensity of the reflected light. A voltage charged in the capacitor CS is increased by the photo current which is outputted from the sensor transistor ST2. As the intensity of the incident into the sensor transistor ST2 is increased, the voltage charged in the capacitor CS is increased.

The second substrate 200 further includes a third insulating layer 215 formed at the upper portion of the switching transistor ST1, the sensor transistor ST2, and the capacitor CS, black matrices 220 and color filter layers 230 formed on the third insulating layer 215, and the common electrode 240 formed on the black matrices 220 and the color filter layers 230.

The color filter layers 230 are formed corresponding areas, where the pixel electrodes PE are formed, to produce one of red, green and blue colors, and each black matrix 220 is provided between the color filter layers 230. The common electrode 240 may comprise a transparent electrode such as indium tin oxide (ITO). The scan driving circuits 700 are provided in the third peripheral area PA3 of the second base substrate 210. The scan driving circuits 700 electrically connect a scan printed circuit board (not shown) to the scan lines.

The scan driving circuits 700 may be arranged in the foam of the TCP or the COF. Each scan driving circuit 700 receives a sensor control signal from the scan printed circuit board to generate the scan signal, and outputs the scan signal to each scan line connected thereto.

The read-out circuits 600 are provided in the fourth peripheral area PA4 of the second base substrate 210. The read-out circuits 600 may be arranged in the form of the TCP or the COF. Each read-out circuit 600 charges the sensing voltage received from the read-out line in response to a control signal provided from a printed circuit board (not shown), and sequentially provides a control circuit (not shown) with the charged voltage at a predetermined point in time.

The control circuit generates a two-dimensional coordinate value of the point touched by the finger of a user based on the time at which the scan signal is generated and the received voltage.

For the purpose of convenience, FIGS. 2 and 3 have been described under the assumption that the pixels P1 and the sensors S1 are provided at positions different from each other. However, the present invention is not limited thereto. For example, that the pixels P1 may face the sensors S1.

Figure 4:
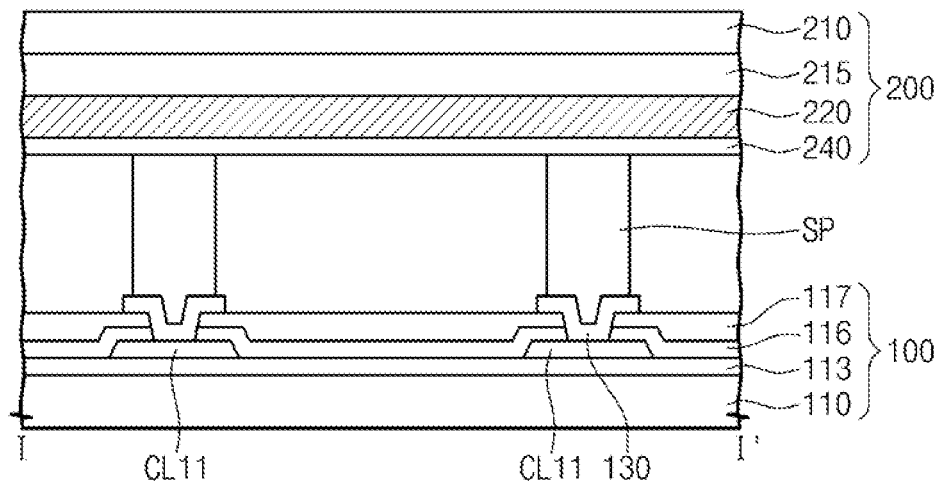
FIG. 4 is a cross sectional view taken along line I-I' of FIG. 1.
Figure 5:
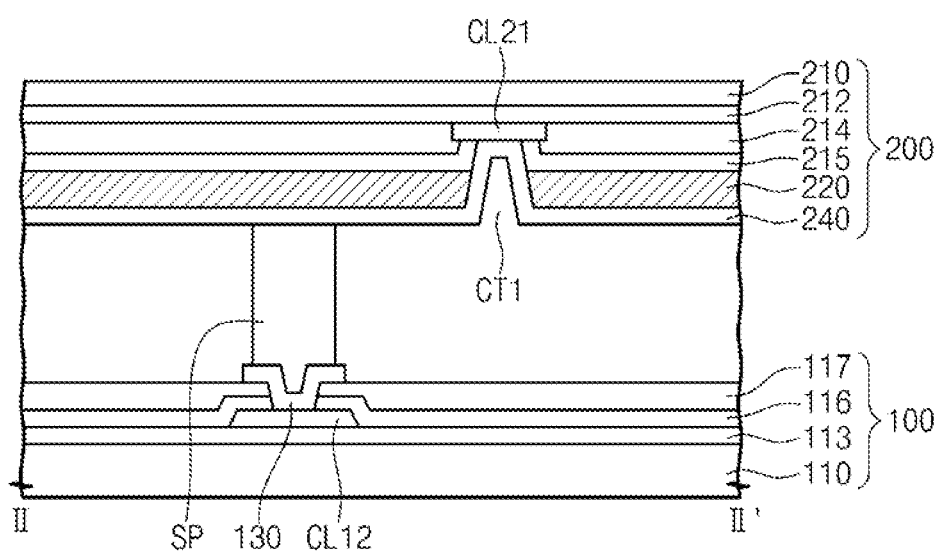
FIG. 5 is a cross sectional view taken along line II-II' of FIG. 1.

FIG. 4 is a cross sectional view taken along line I-I' of FIG. 1 and FIG. 5 is a sectional view taken along line II-IP of FIG. 1.

Referring to FIGS. 1, 4 and 5, a first wire CL1 is formed in the first to fourth peripheral areas PA1 to PA4 of the first base substrate 110 and receives a common voltage from the data driving circuits 400. The first wire CL1 includes a plurality of first sub-wires CL11, which are connected to one end portion of two adjacent data driving circuits 400 in the first peripheral area PA1 and have a U-shape, and a second sub-wire CL12 having a U-shape over the second to fourth peripheral areas PA2 to PA4. The first and second sub-wires and CL11 and CL12 and the data lines are formed on the same layer, and the first and second sub-wires and CL11 and CL12 are spaced apart from the data lines while being insulated from the gate lines by the gate insulating layer 113.

The conductive spacers SP are formed between the first wire CL1 and the common electrode 240. Furthermore, the conductive spacers SP are partially formed on an area corresponding to the first wire CL1. In the first peripheral area PA1, the conductive spacers SP are formed on the first sub-wires CL11. In FIG. 1, the conductive spacers SP are formed corresponding to the first sub-wires CL11 in a one-to-one correspondence. However, the present invention is not limited thereto. For example, a plurality of conductive spacers SP may be formed corresponding to each first sub-wire CL11.

Furthermore, in the third peripheral area PA3, the conductive spacers SP may be formed on the second sub-wires CL12. At this time, each conductive spacer SP may be formed corresponding to each second sub-wire CL12 between the read-out circuits 600 when viewed in the plan view. In FIG. 1, each conductive spacer SP is formed between the read-out circuits 600, but the present invention is not limited thereto. For example, a plurality of conductive spacers SP may be formed. Since a common voltage may be supplied to the common electrode through a second wire (which will be described later) in the third peripheral area PA3, the conductive spacers SP may not provided on the second sub-wires CL12, respectively.

The gate insulating layer 113, the protective layer 116, and the organic insulating layer 117 are partially removed to expose the first sub-wires CL11 and the second sub-wires CL12, thereby forming via holes. The via holes are formed corresponding to areas where the conductive spacers are to be formed.

The first substrate 100 further includes a plurality of contact electrodes 130 which are formed on the organic insulating layer 117 while being electrically connected to the first sub-wire CL11 or the second sub-wire CL12 through the via holes. The conductive spacers SP are formed on the upper surfaces of the contact electrodes 130 while being electrically connected to the contact electrodes 130, respectively. Thus, the common voltage is supplied from the first sub-wire CL11 and the second sub-wire CL12 to the common electrode 240 through the contact electrodes 130 and the conductive spacers SP.

The second substrate 200 includes a plurality of second wires CL21 formed in the third peripheral area PA3 of the second base substrate 210. Each second wire CL21 is connected to one end portion of each read-out circuit 600 to receive the common voltage.

For example, the second wires CL21 and the read-out lines are formed on the same layer. In such a case, the second and third insulating layers 214 and 215 and the black matrix 220 include a first contact hole CT1 which exposes a part of the second wire CL21, and the second wire CL21 is connected to the common electrode 240 through the first contact hole CT1 to supply the common electrode 240 with the common voltage received from the read-out circuit 600.

Since the transparent electrode constituting the common electrode 240 has a high resistance, the common voltage may be uniformly provided as the number of connection lines for supplying the common voltage is large. According to the above-described structure, the common electrode 240 can receive the common voltage through the first wire CL1 and the second wire CL21, and accordingly the common voltage may be uniformly provided to the entire area where the common electrode is formed. Furthermore, as the number of points for providing the common voltage is increased, the common voltage at a constant level is stably provided. Accordingly, the sensing signal may be prevented from being distorted due to the distortion of the common voltage, resulting in the increasing of sensing sensitivity.

In addition, since the conductive spacer SP may not be provided in the third peripheral area PA3 where the second wires CL21 are formed, the number of short points with the first substrate 100 may be reduced.

Figure 6:
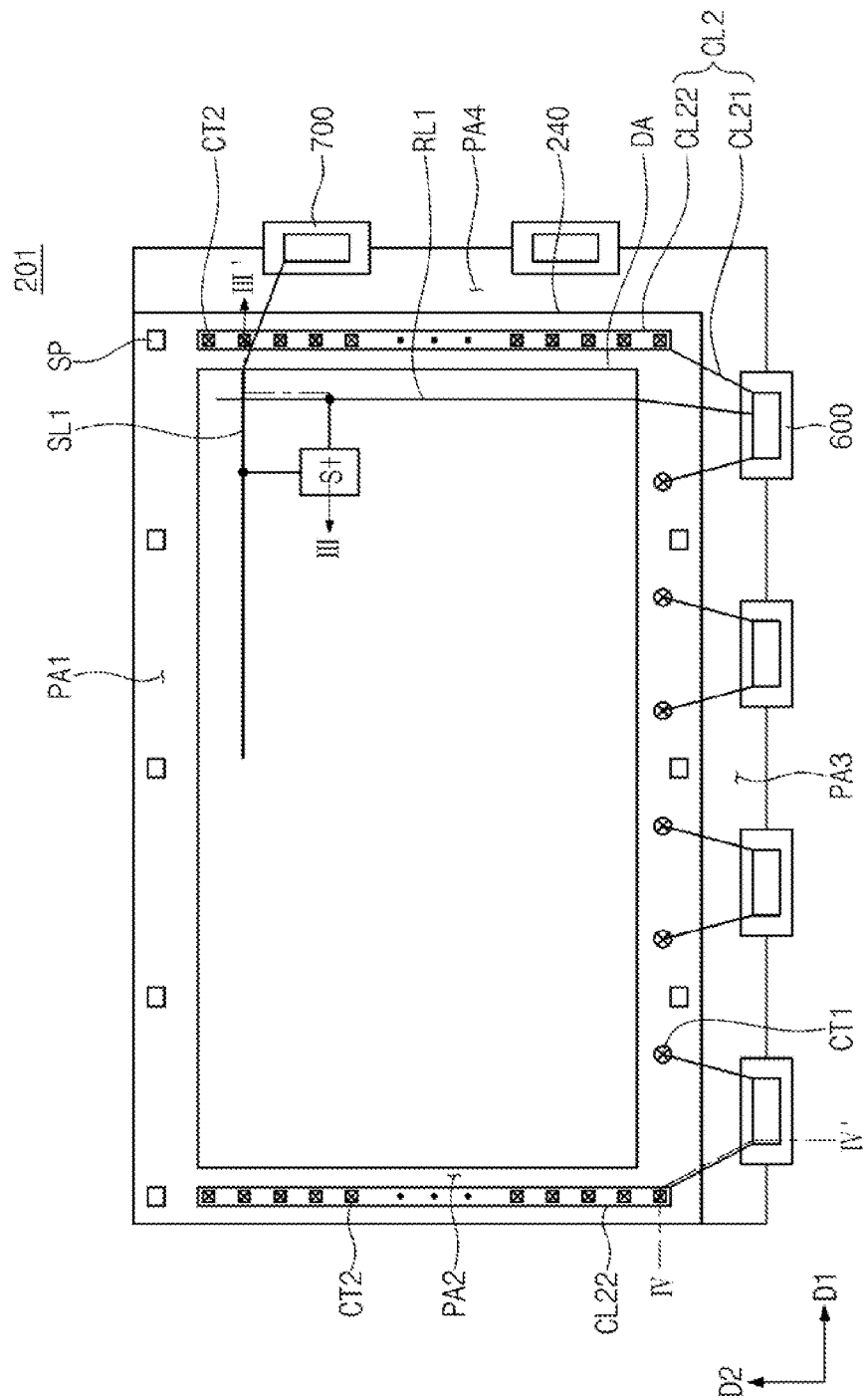
FIG. 6 is a plan view showing a second substrate according to an exemplary embodiment of the present invention.
Figure 7:
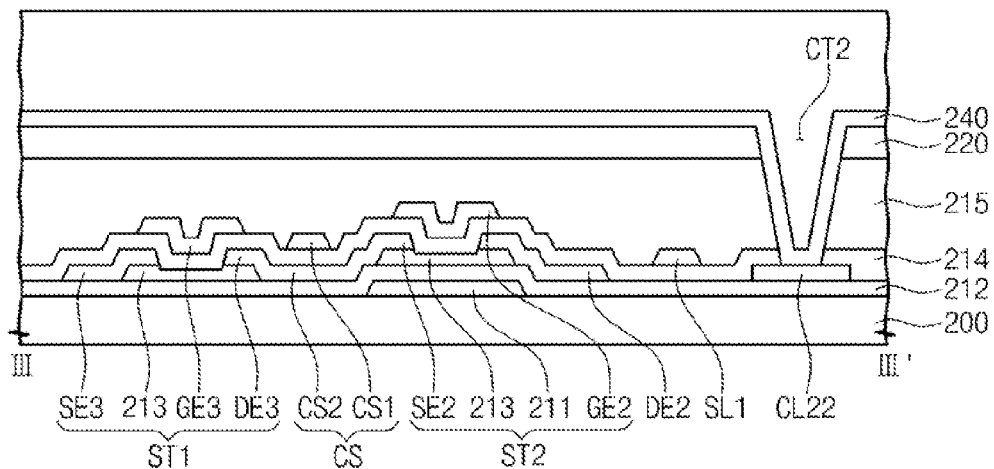
FIG. 7 is a cross sectional view taken along line III-III' of FIG. 6.
Figure 8:
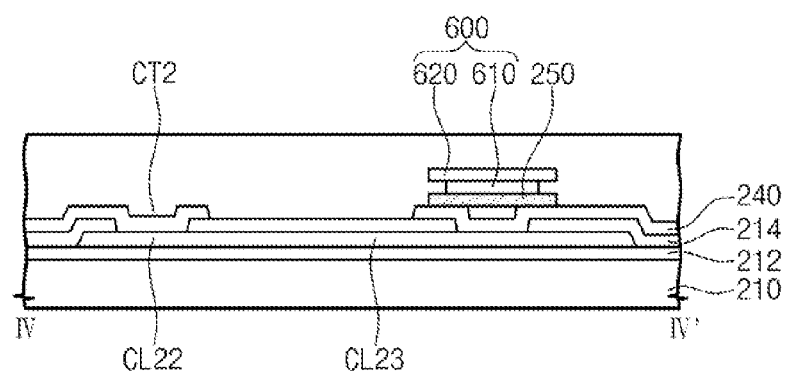
FIG. 8 is a cross sectional view taken along line IV-IV' of FIG. 6.

FIG. 6 is a plan view showing a second substrate according to an exemplary embodiment of the present invention, FIG. 7 is a cross sectional view taken along line III-III' of FIG. 6, and FIG. 8 is a cross sectional view taken along line IV-IV' of FIG. 6. Differences between the second substrate 201 shown in FIG. 6 and the second substrate 200 of FIGS. 1-5 are discussed below. Furthermore, the same reference numerals may be used to refer to the same elements as those described above and detailed description thereof will be omitted. The structure of a display device utilizing the two alternative exemplary second substrates may be otherwise identical.

Referring to FIGS. 6 to 8, the second substrate 201 includes a second wire CL2 formed in second to fourth peripheral areas PA2 to PA4. The second wire CL2 includes a plurality of first sub-wires CL21 formed in the third peripheral area PA3, and second sub-wires CL22 formed in the second and fourth peripheral areas PA2 to PA4.

The first sub-wires CL21 and the second sub-wires CL22 are formed on the first insulating layer 212, in a manner similar to the formation of the first read-out line RL1. Consequently, the first sub-wires CL21 and the second sub-wires CL22 can be insulated from the scan lines by the first insulating layer 212. The second sub-wires CL22 may include a material identical to that of the first read-out line RL1. Furthermore, the second sub-wires CL22 may be integrally formed with one of the first sub-wires CL21. The first sub-wires CL21 extend to areas where the read-out circuits 600 are formed. An ITO electrode is formed on each first sub-wire CL21 in line with the common electrode 240 and each read-out circuit 600 is attached to the ITO electrode by a conductive adhesive 250 provided on the ITO electrode. The read-out circuit 600 may be arranged in the form of the COF and includes a read line 610 for transmitting a common voltage to a driving chip 520 and each first sub-wire CL21. The second sub-wire CL22 has a rod shape extending in the second direction D2. The second sub-wire CL22 receives the common voltage from the read-out circuit 600 through the first sub-wire CL21. The second and third insulating layers 214 and 215 include a plurality of second contact holes CT2 which expose a part of the second sub-wires CL22. In FIG. 6, the second contact holes CT2 are formed in the second direction D2. However, the present invention is not limited thereto. The second sub-wires CL22 are connected to the common electrode 240 through the second contact holes CT2.

According to the above-described structure, the common electrode 240 can receive the common voltage through the first wires CL1 and the second wires CL2. The further inclusion of the second sub-wires CL22 formed in the second direction D2, may allow for the common voltage to be more stably supplied. Furthermore, the common voltage at a constant level is stably provided, and accordingly, the sensing signal may be prevented from being distorted due to the distortion of the common voltage, resulting in the increasing of sensing sensitivity.

In addition, since the conductive spacers SP may not be provided in the third peripheral area PA3 where the first wires CL21 are formed, the number of short points with the first substrate 100 may be reduced.

Figure 9:
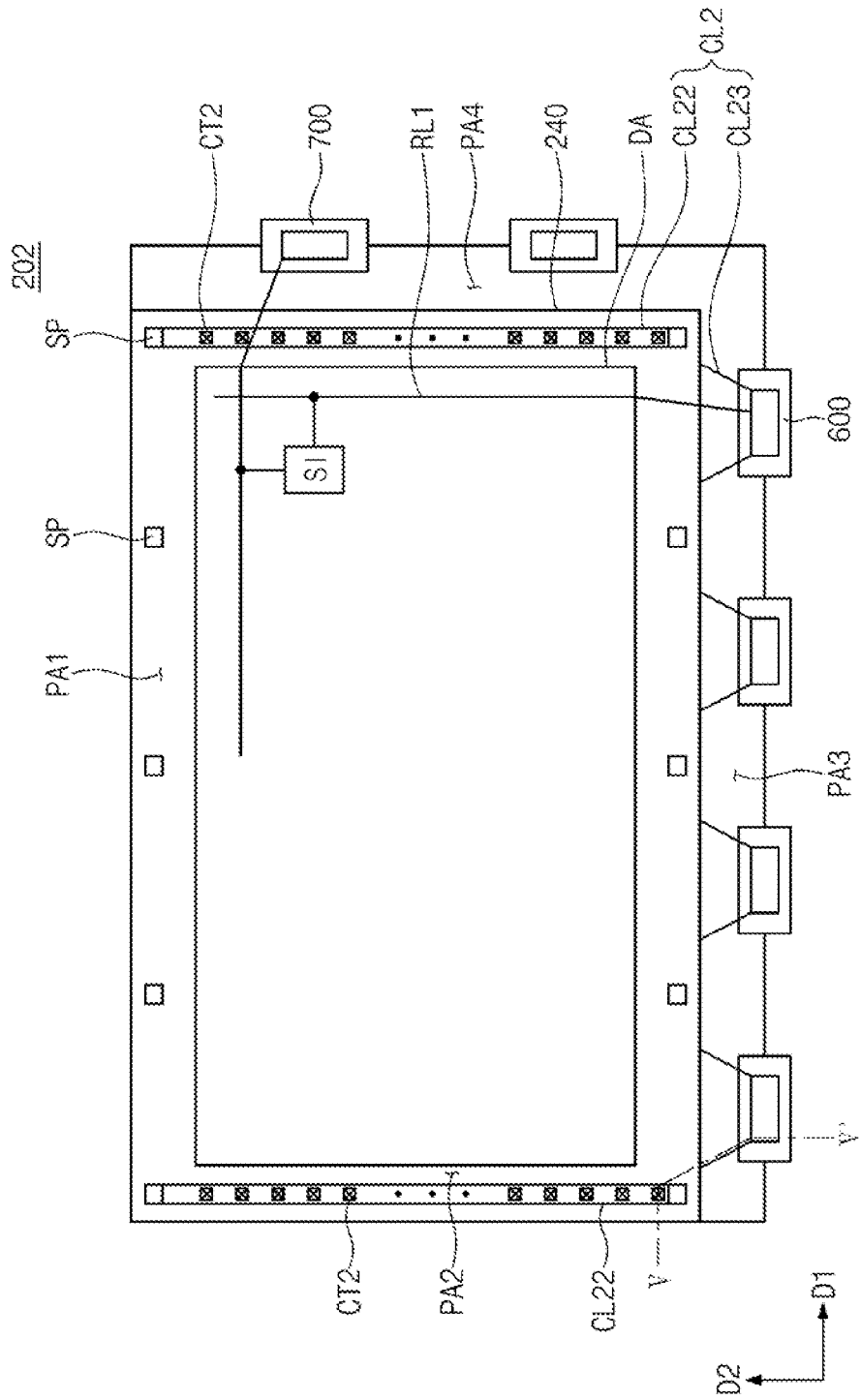
FIG. 9 is a plan view showing a second substrate according to an exemplary embodiment of the present invention.
Figure 10:
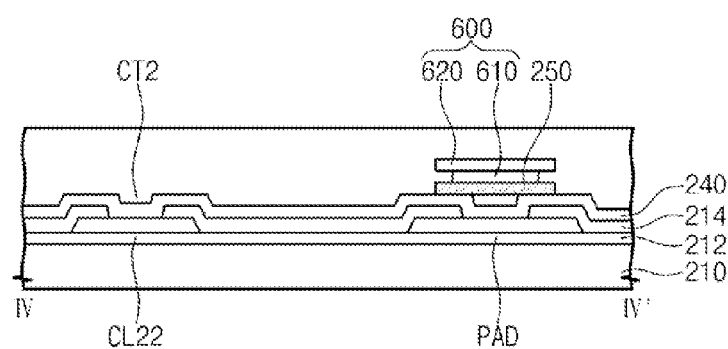
FIG. 10 is a cross sectional view taken along line V-V' of FIG. 9.

FIG. 9 is a plan view showing a second substrate according to an exemplary embodiment of the present invention, and FIG. 10 is a cross sectional view taken along line V-V' of FIG. 9. The same reference numerals may be used to refer to the same elements as those described above and detailed description thereof may be omitted. FIG. 9 illustrates an alternative second substrate 202 that may be used in a display device 10 in place of the other second substrates 200 and 201 described above. Referring to FIGS. 9 and 10, each first sub-wire CL23 and the common electrode 240 are formed on the same layer and include the same material. Each first sub-wire CL23 is integrally formed with the common electrode 240 and an ITO electrode provided at the lower portion of the read-out circuit 600.

The read-out circuit 600 is attached by the conductive adhesive 250 provided on the ITO electrode, in a manner similar to that described above. The read-out circuit 600 applies the common voltage to the first sub-wire CL23 through the ITO electrode. As described above, since the ITO electrode, the first sub-wire CL23, and the common electrode 240 are integrally formed with one another, the common voltage is directly applied to the common electrode 240. A pad electrode PAD may be provided at the lower portion of the ITO electrode, wherein the pad electrode PAD and the second sub-wires CL22 are formed on the same layer.

The second sub-wires CL22 are connected to the common electrode 240 through the second contact holes CT2. Since the second sub-wires CL22 are not connected to the first sub-wire CL23, the second sub-wires CL22 receive the common voltage from the common electrode 240 through a part of the second contact holes CT2, and transmit the common voltage to another portion of the common electrode 240 connected through the second contact holes CT2.

According to the above-described structure, since the second sub-wires CL22 include a material having resistance lower than that of the common electrode 240, the common voltage may be uniformly transmitted to the entire area, where the common electrode 240 is formed, by using the second sub-wires CL22. Consequently, the sensing signal may be prevented from being distorted due to the distortion of the common voltage, and the sensing sensitivity of the touch panel may be increased.

Figure 11:
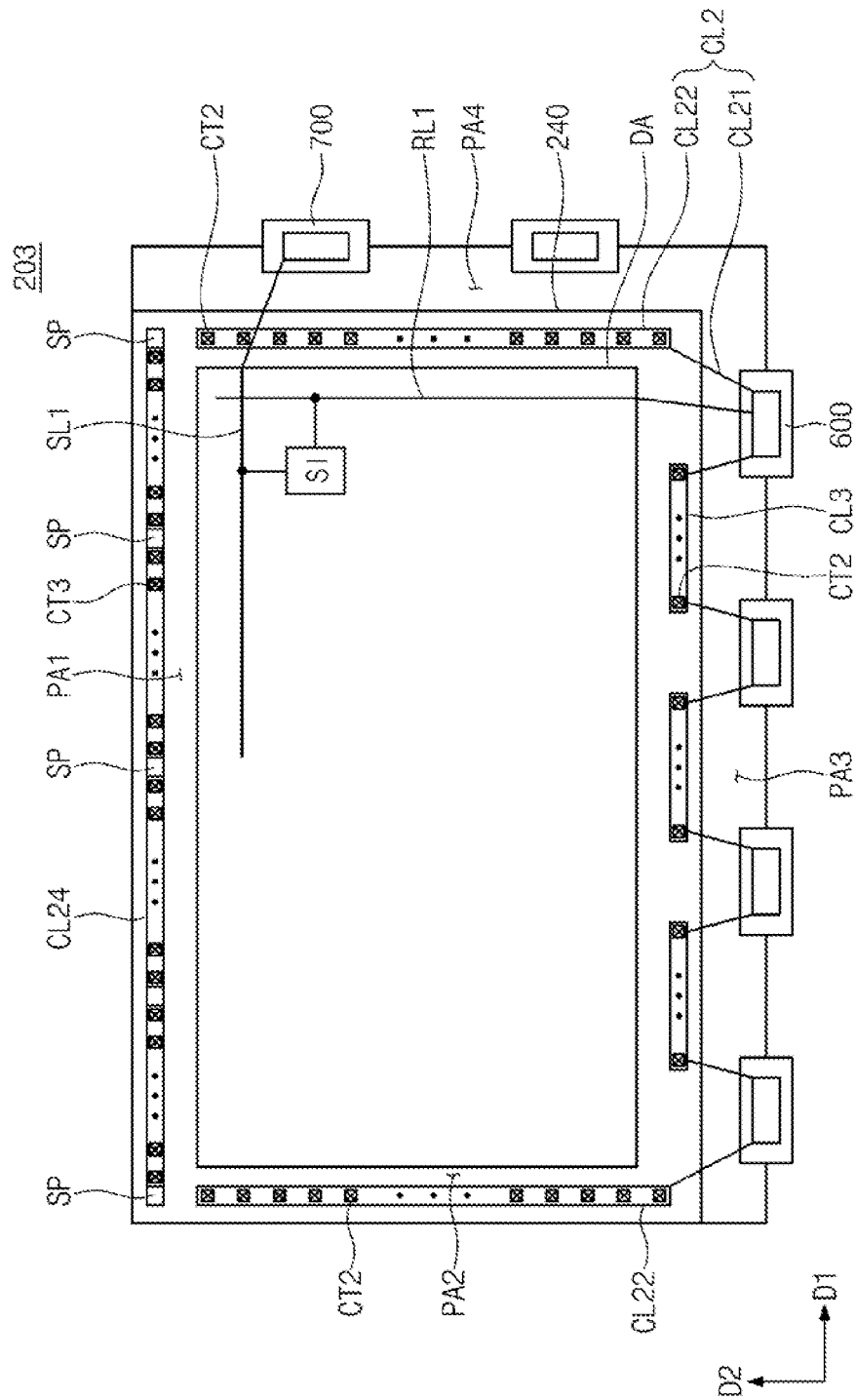
FIG. 11 is a plan view showing a second substrate according to an exemplary embodiment of the present invention.

FIG. 11 is a plan view showing a second substrate 203 according to an exemplary embodiment of the present invention. The same reference numerals may be used to refer to the same elements and detailed description thereof may be omitted.

Referring to FIG. 11, the second wire CL2 includes a plurality of first sub-wires CL21 formed in the third peripheral area PA3, the second sub-wires CL22 formed in the second and fourth peripheral areas PA2 and PA4, and a third sub-wire CL24 formed in the first peripheral area PA1.

The third sub-wire CL24 has a rod shape extending in the first direction D1. The third sub-wire CL24 is connected to the first wire by the conductive spacers SP to receive the common voltage. Furthermore, the third sub-wire CL24 is connected to the common electrode through a third contact hole CT3 and supplies the common electrode with the common voltage.

Although not shown in the drawing, the third sub-wire CL24 and the first and second sub-wires CL21 and CL22 may be formed on the same layer. The third contact hole CT3 may be formed similarly to the second contact hole CT2. However, the present invention is not limited thereto. For example, the third sub-wire CL24 and the third gate electrode GE3 of the sensing transistor ST2 may be formed on the same layer. In such a case, the third contact hole CT3 may be formed by removing a part of the third insulating layer 215 and a part of the black matrix 220 shown in FIG. 7.

The second substrate 203 includes a plurality of third wires CL3 formed among the first sub-wires CL21. The third wires CL3 extend in the first direction D1 and are arranged in the form of a block. Both ends of each third wire CL3 are connected to the first sub-wires CL21 to receive the common voltage from the first sub-wires CL21.

Although not shown in the drawing, the third wires CL3 and the first sub-wires CL21 are formed on the same layer. Similarly to the second sub-wires CL22, the third wires CL3 are connected to the common electrode through the second contact holes CT2 to supply the common electrode 240 with the common voltage.

In FIG. 11, the third sub-wire CL24 is arranged in the form of a single wire. However, the third sub-wire CL24 may be arranged in the form of a block, similarly to the third wire CL3.

According to the above-described structure, the common electrode 240 can receive the common voltage through the first wire CL1 and the second wire CL2. Furthermore, since exemplary embodiments of the present invention may further includes the second sub-wires CL22 formed in the second direction and the third sub-wire CL24 formed in the first peripheral area PA1, the common voltage may be supplied more stably. In addition, the common voltage at a constant level is stably provided, and accordingly, the sensing signal may be prevented from being distorted due to the distortion of the common voltage, resulting in the increase of sensing sensitivity.

Moreover, since, according to some exemplary embodiments, the conductive spacer SP is not provided in the third peripheral area PA3 where the first sub-wires CL21 are formed, the number of short points with the first substrate 100 may be reduced.

Figure 12:
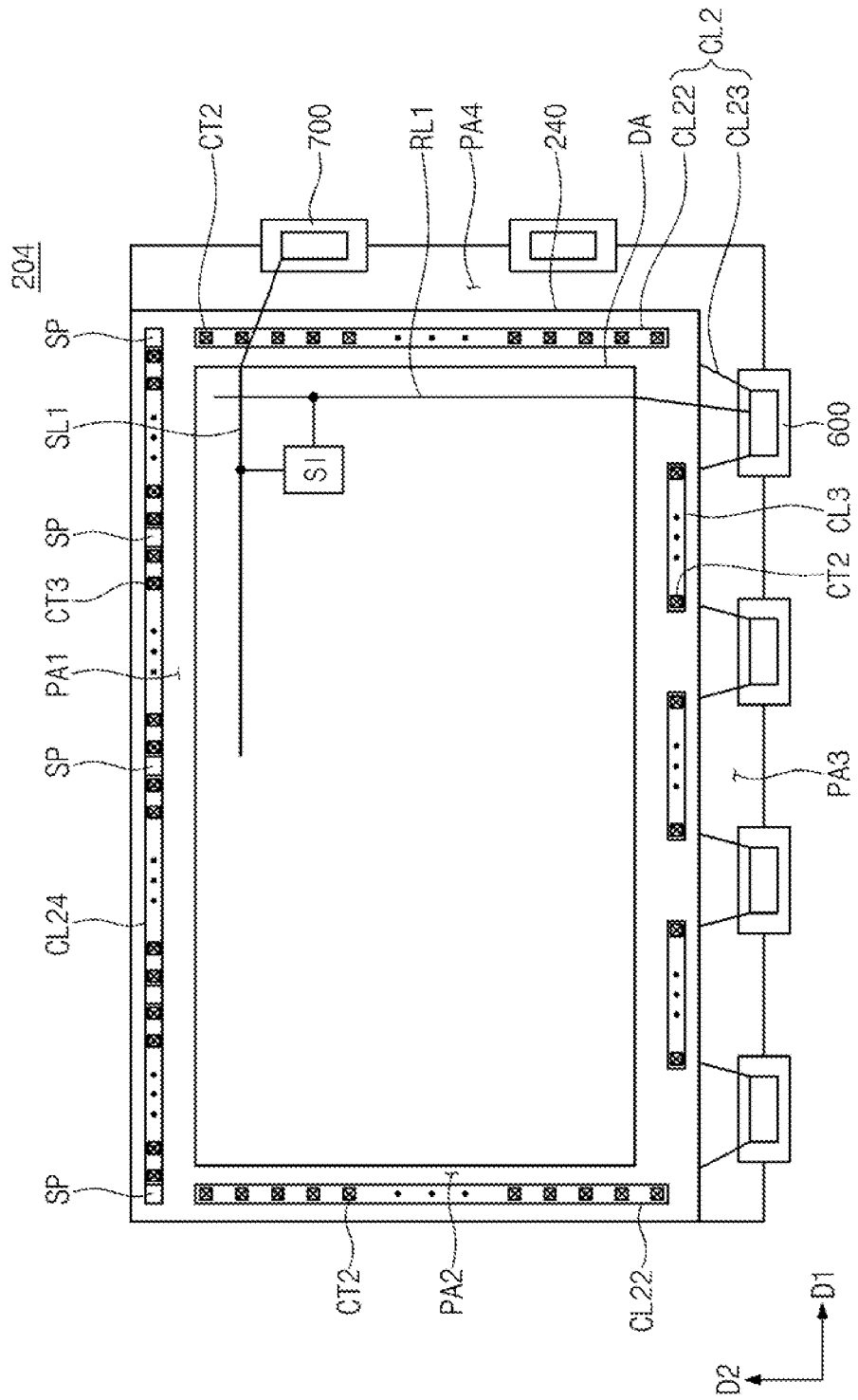
FIG. 12 is a plan view showing a second substrate according to an exemplary embodiment of the present invention.

FIG. 12 is a plan view showing a second substrate according to an exemplary embodiment of the present invention. The same reference numerals may be used to refer to the same elements and detailed description thereof may be omitted.

Referring to FIG. 12, the second substrate 204 includes the second wire CL2 and a plurality of third wires CL3. The second wire CL2 includes a plurality of first sub-wires CL23 formed in the third peripheral area PA3, the second sub-wires CL22 formed in the second and fourth peripheral areas PA2 and PA4, and the third sub-wire CL24 formed in the first peripheral area PA1. Each third wire CL3 is formed between adjacent two read-out circuits 600.

Although not shown in the drawing, the first sub-wires CL23 are integrally formed with the common electrode 240 and an ITO electrode provided at the lower portion of each read-out circuit 600. Thus, the common electrode 240 directly receives the common voltage through the first sub-wires CL23.

The second sub-wires CL22 and the third sub-wire CL24 are connected to the common electrode 240 through the second contact holes CT2. The second and the third sub-wire CL22 and CL24 and the first sub-wires CL23 are formed on different layers. Furthermore, the second and the third sub-wire CL22 and CL24 receive the common voltage from the common electrode 240 through a part of the second contact holes CT2, and transmit the common voltage to another portion of the common electrode 240 connected through the second contact holes CT2.

According to the above-described structure, since the second and the third sub-wire CL22 and CL24 include a material having a resistance lower than that of the common electrode 240, the common voltage may be uniformly transmitted to the entire area, where the common electrode 240 is formed, by using the second and the third sub-wire CL22 and CL24. Consequently, the sensing signal may be prevented from being distorted due to the distortion of the common voltage, resulting in the increase of sensing sensitivity of the touch panel.

Figure 13:
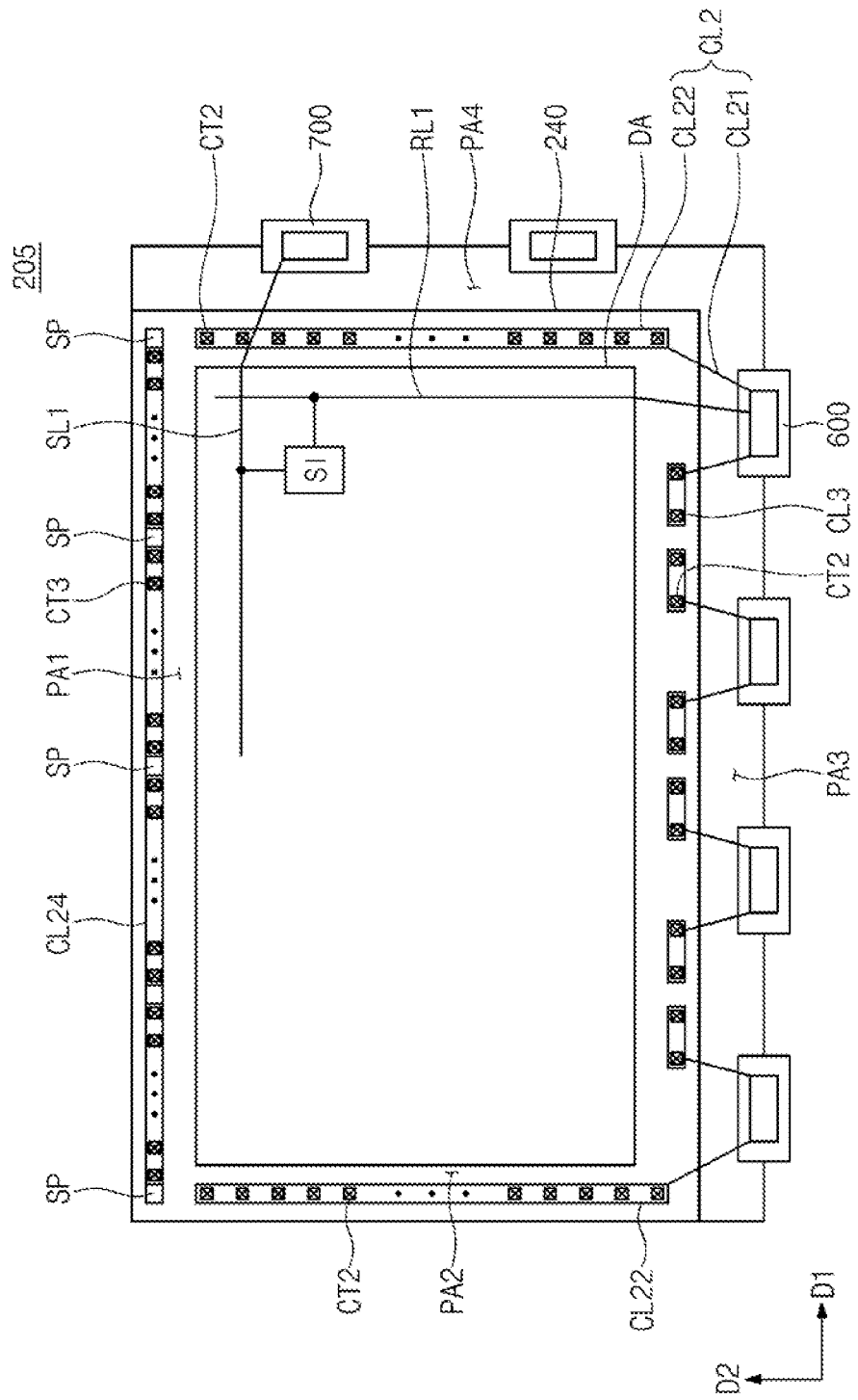
FIG. 13 is a plan view showing a second substrate according to an exemplary embodiment of the present invention.

FIG. 13 is a plan view showing a second substrate 205 according to an exemplary embodiment of the present invention. The same reference numerals may be used to refer to the same elements and detailed description thereof may be omitted.

Referring to FIG. 13, the second substrate 205 includes the second wire CL2, which includes a plurality of first sub-wires CL21 formed in the third peripheral area PA3, the second sub-wires CL22 formed in the second and fourth peripheral areas PA2 and PA4, and the third sub-wire CL24 formed in the first peripheral area PA1, and a plurality of third wires CL3 formed among the first sub-wires CL21.

Each third wire CL3 has a rod shape extending in the first direction D1. All the first sub-wires CL21 may be connected to one another through the third wires CL3. However, the third wires CL3 may be connected to the first sub-wires CL21 in a one-to-one fashion.

Each read-out circuit 600 may independently apply the common voltage to the third wires CL3 through the first sub-wires CL21.

Figure 14:
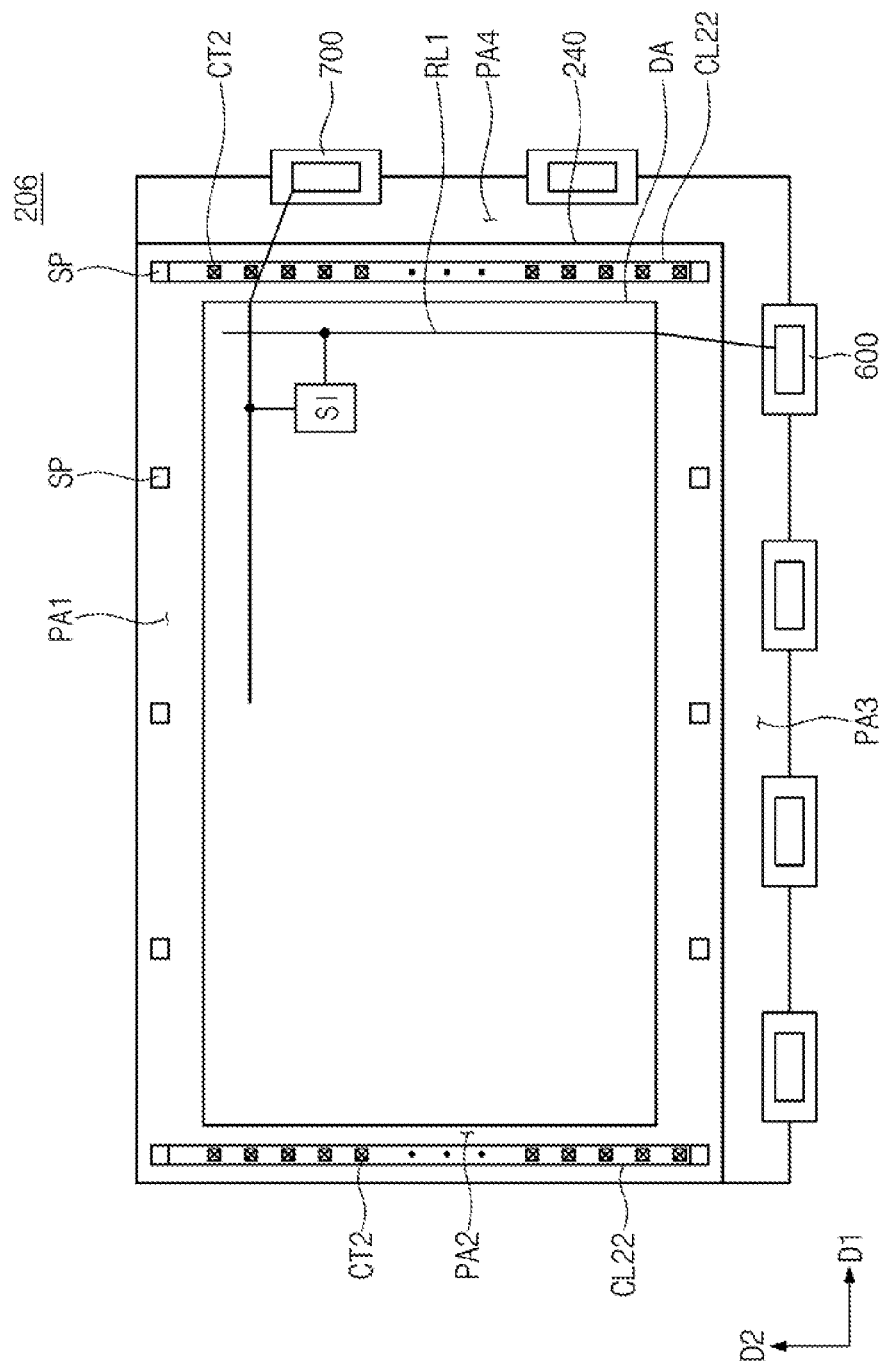
FIG. 14 is a plan view showing a second substrate according to an exemplary embodiment of the present invention.

FIG. 14 is a plan view showing a second substrate 206 according to an exemplary embodiment of the present invention. The same reference numerals may be used to refer to the same elements as those of the first to sixth embodiments and detailed description thereof may be omitted.

Referring to FIG. 14, the second substrate 206 includes the second sub-wires CL22 formed in the second and fourth peripheral areas PA2 and PA4. The second sub-wires CL22 are connected in the second direction D2, and connected to the common electrode through the second contact holes CT2 and apply the common voltage to the common electrode. Although not shown in the drawing, the second sub-wires CL22 overlap on areas where the conductive spacers are formed and receive the common voltage from the first wire.

According to the above-described structure, the common electrode can receive the common voltage through the first wire CL1 and the second sub-wires CL22, and the common voltage can be stably supplied to the common electrode. Thus, the common voltage may be uniformly provided to the entire area where the common electrode is formed. In addition, the common voltage at a constant level is stably provided, and the sensing signal may be prevented from being distorted due to the distortion of the common voltage, resulting in the increase of sensing sensitivity.

Figure 15:
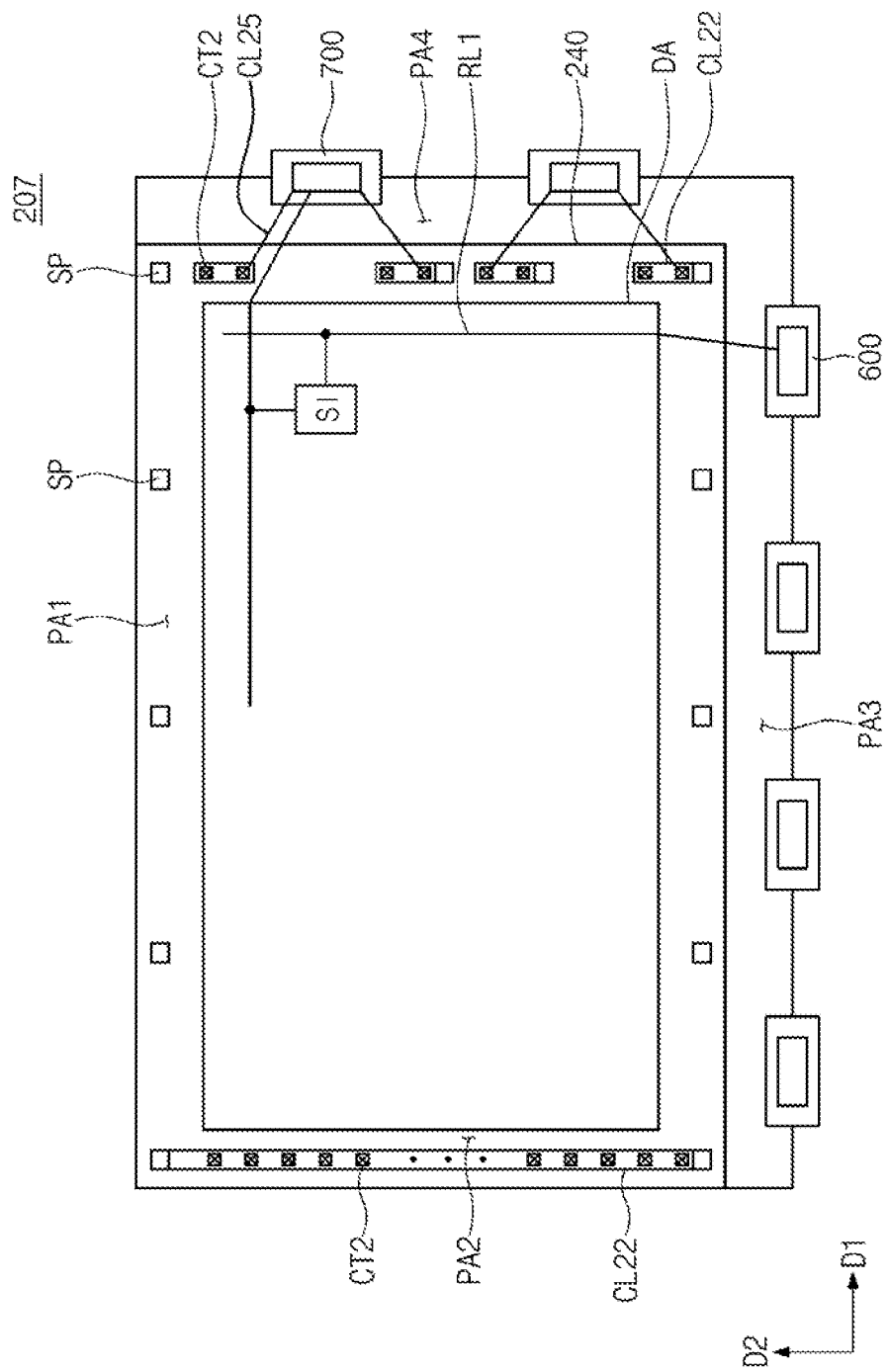
FIG. 15 is a plan view showing a second substrate according to an exemplary embodiment of the present invention.

FIG. 15 is a plan view showing a second substrate 207 according to an exemplary embodiment of the present invention. The same reference numerals may be used to refer to the same elements as those described above and detailed description thereof may be omitted.

Referring to FIG. 15, the second substrate 207 includes the second sub-wires CL22 foamed in the second and fourth peripheral areas PA2 and PA4.

Each second sub-wire CL22 formed in the fourth peripheral area PA4 is arranged in the form of a plurality of blocks extending in the second direction D2. Each second sub-wire CL22 is provided between adjacent two scan driving circuits 700, and is connected to each scan driving circuit 700 through each fourth sub-wire CL25 and receives the common voltage. Furthermore, each second sub-wire CL22 is connected to the common electrode 240 through the second contact hole CT2 and applies the common voltage to the common electrode 240.

The fourth sub-wires CL25 are connected to the second sub-wires CL22 in a one-to-one fashion. Consequently, each scan driving circuit 700 can independently apply the common voltage to the each second sub-wire CL22 through each fourth sub-wire CL25. However, the shape of the second sub-wire CL22 is not limited thereto. For example, all the first sub-wires CL21 may be connected to one another through the third wires. In addition, the second sub-wires CL22 formed in the second peripheral area PA2 may include a plurality of blocks, similarly to the sub-wires CL22 formed in the fourth peripheral area PA4.

Although the exemplary embodiments of the present invention have been described, it is understood that the present invention should not be limited to these exemplary embodiments but various changes and modifications can be made.

What is claimed is:

1. A display device comprising:
 a first substrate comprising a plurality of pixels that display an image and a first wire that transmits a common voltage received from an outside source;
 a second substrate opposite to the first substrate, the second substrate comprising a second wire that transmits the common voltage received from the outside source and a common electrode that receives the common voltage from the first wire and the second wire;
 a plurality of sensors that sense an external signal and output sensing signals;
 a liquid crystal layer interposed between the first substrate and the second substrate; and
 a conductive spacer formed between the first wire and the common electrode electrically connecting the first wire and the common electrode,
 wherein the second wire and the common electrode are disposed on different layers.

2. The display device of claim 1, wherein the first substrate comprises a display area where the pixels are formed, and first to fourth peripheral areas that surround the display area, and the first peripheral area comprises a data driving circuit that supplies a data voltage to the pixels, the third peripheral area is opposite to the first peripheral area, the second peripheral area connects one end portion of the first peripheral area to one end portion of the third peripheral area, and the fourth peripheral area is opposite to the second peripheral area.

3. The display device of claim 2, wherein the second substrate comprises first to fourth peripheral areas which correspond to the first to fourth peripheral areas of the first substrate in a one-to-one fashion, and wherein the second wire is formed in at least one of the first to fourth peripheral areas of the second substrate.

4. The display device of claim 2, wherein the conductive spacer is provided in plural, and the plurality of conductive spacers are provided only on the first wire formed in the first and third peripheral areas of the first substrate.

5. The display device of claim 2, wherein the conductive spacer is provided only on the first wire formed in the first peripheral area of the first substrate.

6. The display device of claim 3, wherein the second wire comprises a plurality of second wire sub-wires.

7. The display device of claim 6, wherein a group of the second wire sub-wires are formed in the second and fourth peripheral areas of the second substrate and extends in a first direction.

8. The display device of claim 7, further comprising a plurality of scan driving circuits provided in the fourth peripheral area of the second substrate, wherein one end portion of each second wire sub-wire formed in the fourth peripheral area of the second substrate is connected to the scan driving circuits, and the each second wire sub-wire formed in the fourth peripheral area of the second substrate receives the common voltage through the scan driving circuits.

9. The display device of claim 8, wherein the second wire sub-wires that are not part of the group are formed in the first peripheral area of the second substrate, and are connected to the first wire by the conductive spacers to receive the common voltage.

10. The display device of claim 9, wherein the second wire sub-wires which are formed in the first peripheral area of the second substrate extend in a second direction crossing the first direction.

11. The display device of claim 6, wherein the second wire sub-wires are formed in the third peripheral area of the second substrate.

12. The display device of claim 11, wherein the second wire sub-wires formed in the third peripheral area of the second substrate are spaced apart from one another, and the second substrate further comprises a plurality of third wires connected to the second wire sub-wires and the common electrode, to the third wires applying the common voltage to the common electrode.

13. The display device of claim 12, wherein the third wires are connected to the second wire sub-wires formed in the third peripheral area of the second substrate in a one-to-one correspondence.

14. The display device of claim 13, wherein the second wire sub-wires and the third wires are formed on a same layer.

15. The display device of claim 13, wherein the second wire sub-wires formed in the third peripheral area of the second substrate and the common electrode are formed on a same layer.

16. The display device of claim 15, further comprising a read-out circuit provided in the third peripheral area of the second substrate, and wherein each second wire sub-wire has one end portion connected to the read-out circuit and receives the common voltage through the read-out circuit.

17. The display device of claim 1, wherein the conductive spacer is aligned with the first wire.

18. The display device of claim 1, wherein each of the plurality of sensors is formed on the second substrate.

19. The display device of claim 18, wherein each of the plurality of sensors further comprises a switching transistor, and the switching transistor comprises: a source electrode formed on the second substrate; a drain electrode spaced apart from the source electrode; and a gate electrode formed on the source electrode and the drain electrode.

20. The display device of claim 19, wherein the second wire and the source and drain electrodes are formed on a same layer, and the second substrate further comprises an insulating layer that covers the switching transistor and has at least one contact hole exposing a part of the second wire, and the second wire is connected to the common electrode through the contact hole.

21. A display device comprising:
a first substrate comprising a plurality of pixels that display an image and a plurality of first wires that transmit a common voltage;
a second substrate opposite to the first substrate, the second substrate comprising a second plurality of wires that transmit the common voltage, and a common electrode that receive the common voltage from the first wires and the second wires;
a plurality of sensors that sense an external signal and output sensing signals;
a liquid crystal layer interposed between the first substrate and the second substrate; and
a plurality of conductive spacers formed between the first wires and the common electrode electrically connecting the first wires and the common electrode, each of the plurality of conductive spacers corresponding to one of the first wires with a one-to-one correspondence,
wherein the second wire and the common electrode are disposed on different layers.

* * * * *